(12) United States Patent
Chang et al.

(10) Patent No.: US 8,054,376 B2
(45) Date of Patent: Nov. 8, 2011

(54) IMAGE SENSOR HOLDER

(75) Inventors: Chi-Wei Chang, Taipei Hsien (TW);
Heng-Hsin Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 378 days.

(21) Appl. No.: 12/431,718

(22) Filed: Apr. 28, 2009

(65) Prior Publication Data
US 2010/0110281 A1 May 6, 2010

(30) Foreign Application Priority Data

Nov. 6, 2008 (CN) .......................... 2008 1 0305403

(51) Int. Cl.
*H04N 5/225* (2006.01)
(52) U.S. Cl. .................. 348/373; 348/208.99; 348/335; 74/10.9; 74/469; 74/813
(58) Field of Classification Search ............. 348/208.99, 348/208.1–208.16, 335, 373, 374, 375; 74/10.8, 74/10.9, 813, 827, 467, 609
See application file for complete search history.

(56) References Cited

U.S. PATENT DOCUMENTS

| 7,742,101 | B2 * | 6/2010 | Nomura et al. | 348/374 |
| 2007/0257989 | A1 * | 11/2007 | Shirono | 348/208.99 |
| 2008/0151065 | A1 * | 6/2008 | Okumura et al. | 348/208.4 |
| 2009/0009657 | A1 * | 1/2009 | Kawai | 348/373 |
| 2009/0091632 | A1 * | 4/2009 | Okamoto et al. | 348/208.7 |

\* cited by examiner

*Primary Examiner* — Tuan Ho
*Assistant Examiner* — Kent Wang
(74) *Attorney, Agent, or Firm* — Altis Law Group, Inc.

(57) ABSTRACT

An image sensor holder a frame, a first slidable holder, a second slidable holder, a first and a second driving arms, a first and a second driving device and at least two restoration devices. The first slidable holder is slidably mounted on the frame. The second slidable holder is slidably mounted on the first slidable holder. The first and second driving devices are separately mounted on the frame. The first driving arm rotatably is mounted on the frame and contacts the first slidable holder and the first driving device by both opposite ends thereof. The second driving arm slidably is mounted on the frame and contacts the second slidable holder and the second driving device respectively by both opposite ends thereof. The restoration devices are respectively positioned on the frame and the first holder for restoring the first and second holders back to original positions.

20 Claims, 6 Drawing Sheets

IMAGE SENSOR HOLDER

BACKGROUND

1. Technical Field

The present disclosure relates to image capture devices and, particularly, to an image sensor holder.

2. Description of Related Art

A known image sensor holder is used as a camera shake correction apparatus in which a first movable stage and a second movable stage are slidably stacked together and can be substantially linearly moved in two orthogonal directions in a plane. The first movable stage and the second movable stage are driven by two actuators mounted on a base frame respectively to move along the two orthogonal directions. Each of the first and second movable stages defines a force-bearing point at which the driving force is directly applied by the two actuators. The two force-bearing points of the first and second movable stages are far separated in order to contact the corresponding actuators. However, due to the separation, a resistance torque is often caused by the first and second actuators between the force-bearing points. As a result, the first and second movable stages are prone to rotate relative to the base frame, which will reduce the location compensation precision when correcting for camera shake.

Therefore, it is desirable to provide an image sensor holder to overcome or at least alleviate the above mentioned problems.

DETAILED DESCRIPTION

Referring to FIGS. 1 to 4, an image sensor holder 100 in accordance to one embodiment is disclosed. The image sensor holder 100 includes a frame 110, a first and a second slidable holders 120, 130, a first and a second driving devices 140, 150, a first and a second driving arms 160, 170, a number of shafts 180, and at least two restoration devices 190. The first slidable holder 120 is slidably mounted on the frame 110 via two shafts 180. The second slidable holder 130 is slidably mounted on the first slidable holder 120 via another two shafts 180. The first and second driving devices 140, 150 are separately mounted on the frame 110. The first driving arm 160 is rotatably mounted on the frame 110 and contacts the first slidable holder 120 and the first driving device 140 at opposite ends thereof for transmitting driving power from the first driving device 140 to drive the first slidable holder 120 to move relative to the frame 110. The second driving arm 170 is slidably mounted on the frame 110 and contacts with the second slidable holder 130 and the second driving device 150 at opposite ends thereof for transmitting driving power from the second driving device 150 to push the second slidable holder 130 to move relative to the first holder 120 in a direction orthogonal to the moving direction of the first slidable holder 120. One end of each restoration device 190 is fixed on the first holder 120, the other ends of the restoration devices 190 are respectively fixed on the frame 110 and the second holder 130 for restoring the first and second holders 120, 130 back to their original positions. In this embodiment, the restoration devices 190 are selected from springs or leaf springs.

Figure 1:
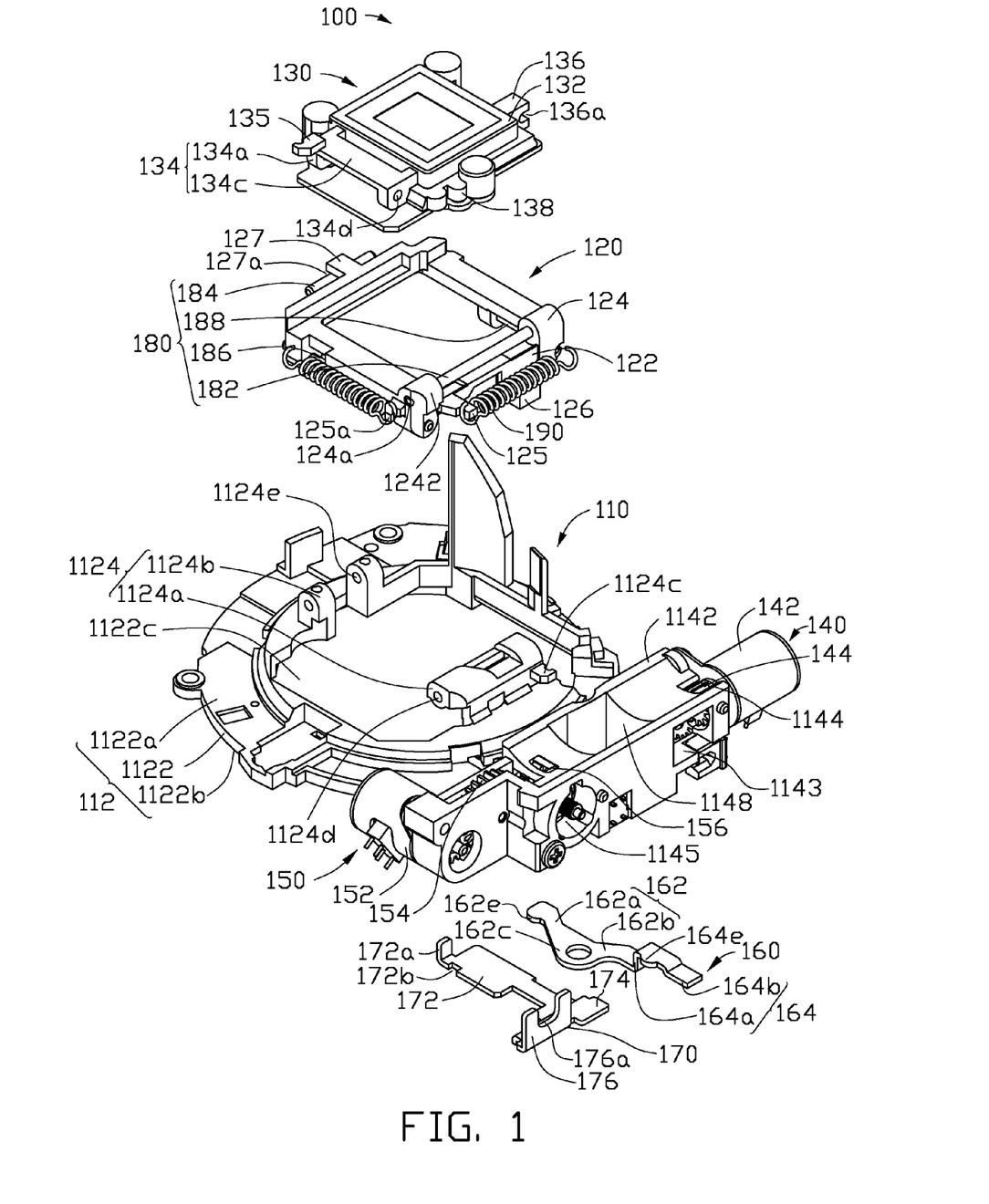
FIG. 1 is an isometric, exploded view of an image sensor holder according to an exemplary embodiment.
Figure 2:
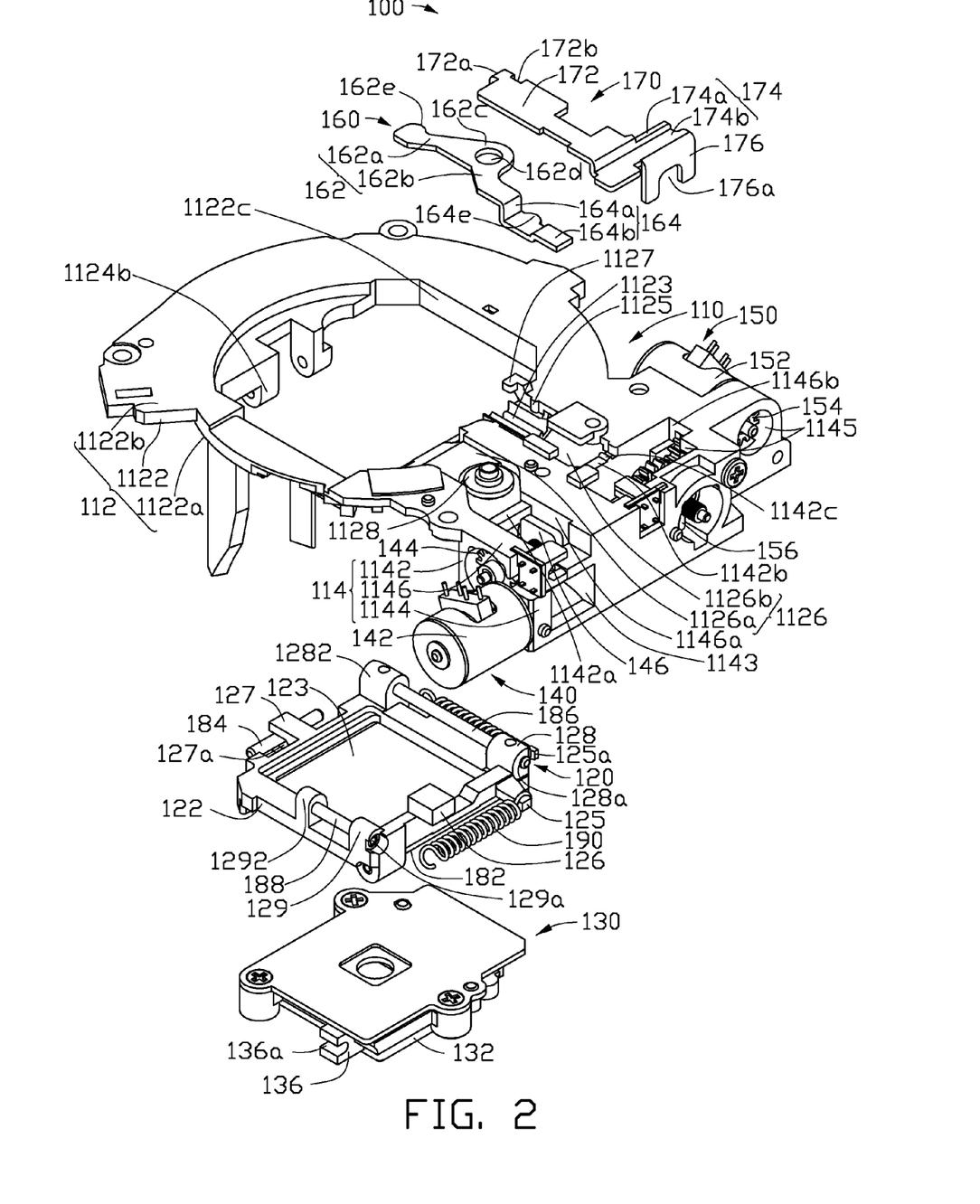
FIG. 2 is an isometric, exploded view of the image sensor holder of FIG. 1 viewed from another perspective.

The frame 110 includes a first support 112 and a second support 114 connected to a side of the first support 112.

The first support 112 includes a substrate 1122 having an upper surface 1122a and an opposite lower surface 1122b, a first shaft holder 1124, a pivot 1128, a number of guiding bars 1123, a number of ribs 1125, and a stop block 1127. The substrate 1122 defines a window 1122c running through the upper and lower surfaces 1122a, 1122b. The first shaft holder 1124 is substantially perpendicularly formed on the upper surface 1122a adjacent to the window 1122c and protruding away from the upper surface 1122a. The first shaft holder 1124 includes a right holder 1124a and a corresponding left holder 1124b, which oppositely stands along the window 1122c of the substrate 1122. The left holder 1124b includes a first hook 1124c formed thereon. The right holder 1124a defines a first through hole 1124d therein. The left holder 1124b defines a second through hole 1124e therein. A first sliding channel 1126a and a second sliding channel 1126b are adjacently defined on the lower surface 1122b of the substrate 1122, adjacent to the right holder 1124a and communicating with the window 1122c of the substrate 1122. The pivot 1128 is formed on the bottom of the second sliding channel 1126b. The guiding bars 1123 are evenly distributed on the bottom of the second sliding channel 1126b in a direction parallel to the sidewalls of the second sliding channel 1126b. The ribs 1125 are separately formed on two sidewalls of the second sliding channel 1126b and substantially perpendicular to the guiding bars 1123. Each of the guiding bars 1123 and the ribs 1125 has a smooth convex surface for reducing friction between the second arm 170 and the guiding bars 1123 and ribs 1125 when the second arm 170 slides in the second sliding channel 1126b. The stop block 1127 is formed on the lower surface 1122b adjacent to the window 1122c and extends from the lower surface 1122b into the second sliding channel 112b for preventing the second sliding arm 170 escaping from the second sliding channel 1126b.

The second support 114 is connected to the side of the first support 112 adjacent to the first and second sliding channel 1126a, 1126b. The second support 114 includes an inner plate 1142, an outer plate 1144 parallel to the inner plate 1142, a top plate 1146 joins the inner and outer plates 1142, 1144, and a number of spacers 1148 substantially perpendicularly connected to the inner, outer and top plates 1142, 1144, 1146. The inner plate 1142 is substantially perpendicularly connected on a side of the substrate 1122 and adjacent to the first and second sliding channels 1126a, 1126b. The top plate 1146 and the substrate 1122 are substantially coplanar. The top plate 1146 defines a first hole 1146a and a second hole 1146b therein corresponding to the first and second sliding channels 1126a, 1126b. The inner plate 1142 defines a first cutout 1142a communicating with the first sliding channel 1126a and the first hole 1146a, and a second cutout 1142b communicating with the second sliding channel 1126b and the second hole 1146b. A number of guiding ribs 1142c are formed on the bottom of the second cutout 1142b and each of the guiding ribs 1142c has a smoothly convex surface for reducing the friction when the second driving arm 170 slides thereon. The spacers 1148 partition the space defined by the inner, outer and top plates 1142, 1144 and 1146 into a first compartment 1143 and a second compartment 1145 isolated from the first compartment 1143. The first compartment 1143 is communicated with the first hole 1146a. The second compartment 1145 is communicated with the second hole 1146b.

The first slidable holder 120 is a square framework and includes a number of first frame walls 122 perpendicularly connected in turns to define a first receiving space 123 therein, a pair of first hold portions 124, 1242, a second hook 125, a protrusion 126, a U-shaped member 127, a pair of second hold portions 128, 1282, a pair of third hold portions 129, 1292 and a third hook 125a. The pair of first hold portions 124, 1242 is oppositely formed on two adjacent joined portions of the first frame walls 122, and each of the hold portions 124, 1242 defines a first shaft hole 124a therein. The first shaft holes 124a align with each other and receive a sliding bar 180 therein. The second hook 125 is protruded outwards from an outer surface of the frame wall 122 between the first hold portions 124, 1242, and cooperates with the first hook 1124c to hitch a restoration device 190 therebetween. The protrusion 126 is formed on the same frame wall 122 the first hook 1124c is formed on, and projects outwards from an outer surface of the frame wall 122 a predetermined distance. The U-shaped member 127 is formed on an outer surface of another frame wall 122 that is parallel with the frame wall 122 having the first hook 1124c and protrusion 126. The U-shaped member 127 defines a sliding cutout 127a thereon. The pair of second hold portions 128, 1282 and the pair of third hold portions 129, 1292 are respectively formed on two parallel frame walls 122 which are perpendicularly connected to the frame wall 122 having the first hook 1124c and the protrusion 126 formed thereon, and are protruded in a direction far away from the first hold portions 124. Each of the second hold portions 128, 1282 defines a second shaft hole 128a therein. The second shaft holes 128a are aligned with each other. Each of the third hold portions 129, 1292 defines a third shaft hole 129a therein. The third shaft holes 129a are aligned with each other. The third hook 125a is protruded from the second hold portion 128.

The second slidable holder 130 is similar to the first slidable holder 120, and includes a number of second frame walls 132 perpendicularly connected in turns, a fourth hold portion 134, a fourth hook 135, a sliding block 136, and a jutting portion 138. The fourth hold portion 134 is formed on the second frame wall 132 corresponding to the pair of second hold portions 128, 1282 of the first slidable holder 120, and includes two separate supporting arms 134a and a connecting plate 134c connecting the supporting arms 134 to each other. Each of the supporting arms 134a defines a fourth shaft hole 134d therein. The fourth shaft holes 134d of the supporting arm 134a are aligned with each other. The fourth hook 135 is formed on the connecting plate 134c corresponding to third hook 125a of the first slidable holder 120 and separated a distance from the third hook 125a. The sliding block 136 is formed on the second frame wall 132 that is parallel with the frame wall 132 having the fourth hold portion 134 formed thereon. The sliding block 136 is protruded outwards from an outer surface of the frame wall 132, and defines a sliding groove 136a therein. The jutting portion 138 is formed on the frame wall 132 orthogonal to the frame 132 having the fourth hold portion 134 formed thereon, and has a smooth convex surface.

The first driving device 140 includes a first motor 142, a first transmitting mechanism 144 meshed with the first motor 142, and a first follower 146 drivably connected to the first transmitting mechanism 144.

The second driving device 150 includes a second motor 152, a second transmitting mechanism 154 meshed with the second motor 152, and a second follower 156 drivably connected to the second transmitting mechanism 154.

The first driving arm 160 includes an driving portion 162 and a follower portion 164 connected to the driving portion 162. The driving portion 162 includes a front arm 162a and a rear arm 162b which are connected together at an angle and cooperatively form a corner portion 162c, and a first convex block 162e extending from the front arm 162a and being planar as the front arm. The corner portion 162c defines a pivot hole 162d therein. The rear portion 164 includes a connecting arm 164a perpendicularly connected to the rear arm 162b of the front portion 162, a pushing arm 164b perpendicularly connected to the connecting arm 164a and parallel with the rear arm 162b. The rear portion 164 further includes a second convex block 164e extending out from the pushing arm 164b along a plane containing the pushing arm 164b.

The second driving arm 170 includes a sliding plate 172, a limiting plate 174 connected to the sliding plate 172, and a pushing plate 176 connected to the limiting plate 174. The sliding plate 172 includes a pushing block 172a perpendicularly formed on an end thereof and defines a number of third cutouts 172b corresponding to the sliding bars 1123 and the stop block 1127. The limiting plate 174 includes an upright plate 174a perpendicularly connected to the other end of sliding plate 172 opposite to the pushing block 172a, and a wing plate 174b perpendicularly connected to the upright plate 174a. The pushing plate 176 is perpendicularly connected to the wing plate 174b by one end thereof, and the other end thereof defines a U-shaped opening 176a therein.

The shaft 180 is configured for slidably connecting the frame 110, and the first and second slidable holds 120, 130. In this embodiment, the image sensor holder 100 includes four shafts 182, 184, 186 and 188.

Figure 3:
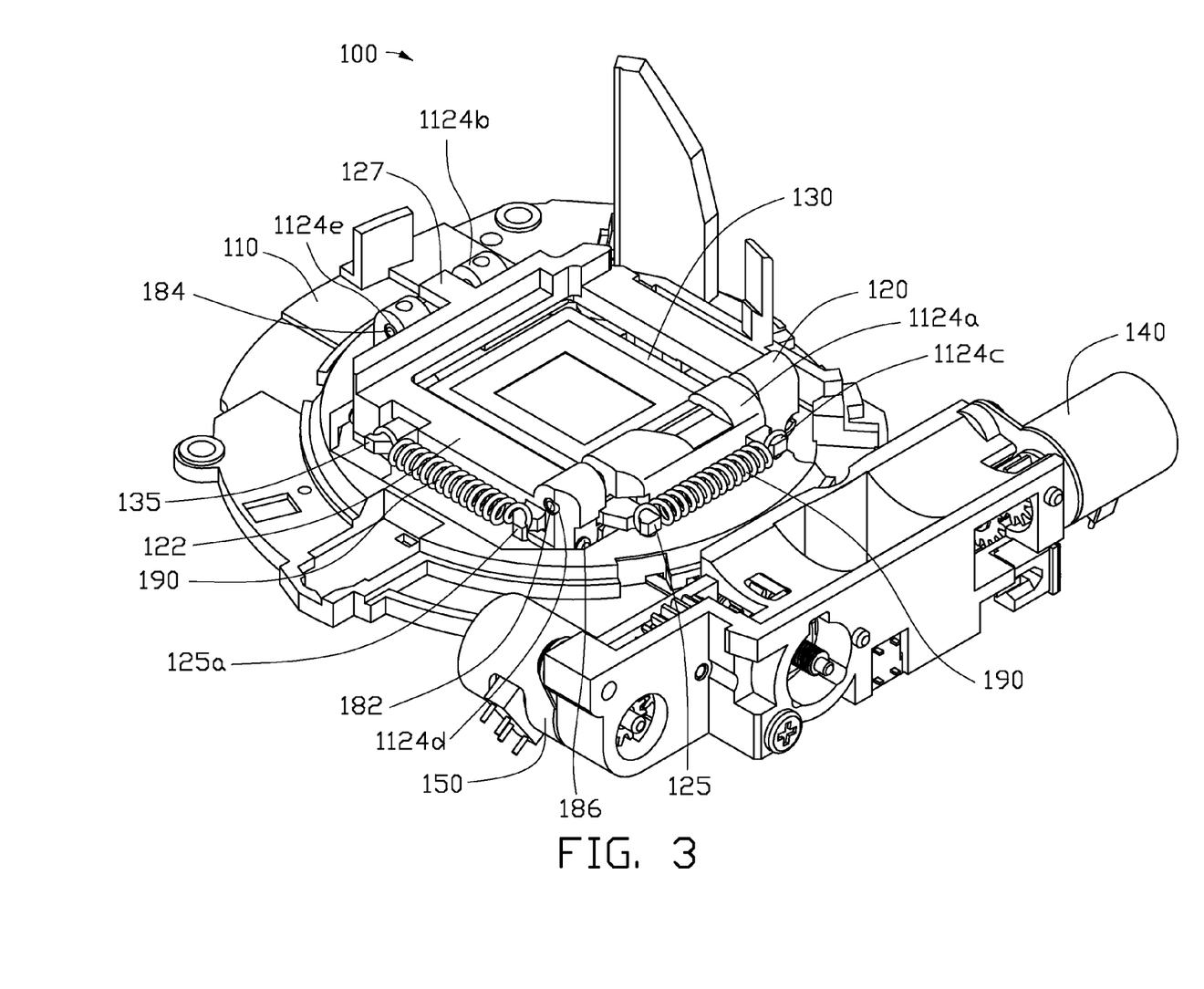
FIG. 3 is an isometric, assembled view of the image sensor holder of FIG. 1.
Figure 4:
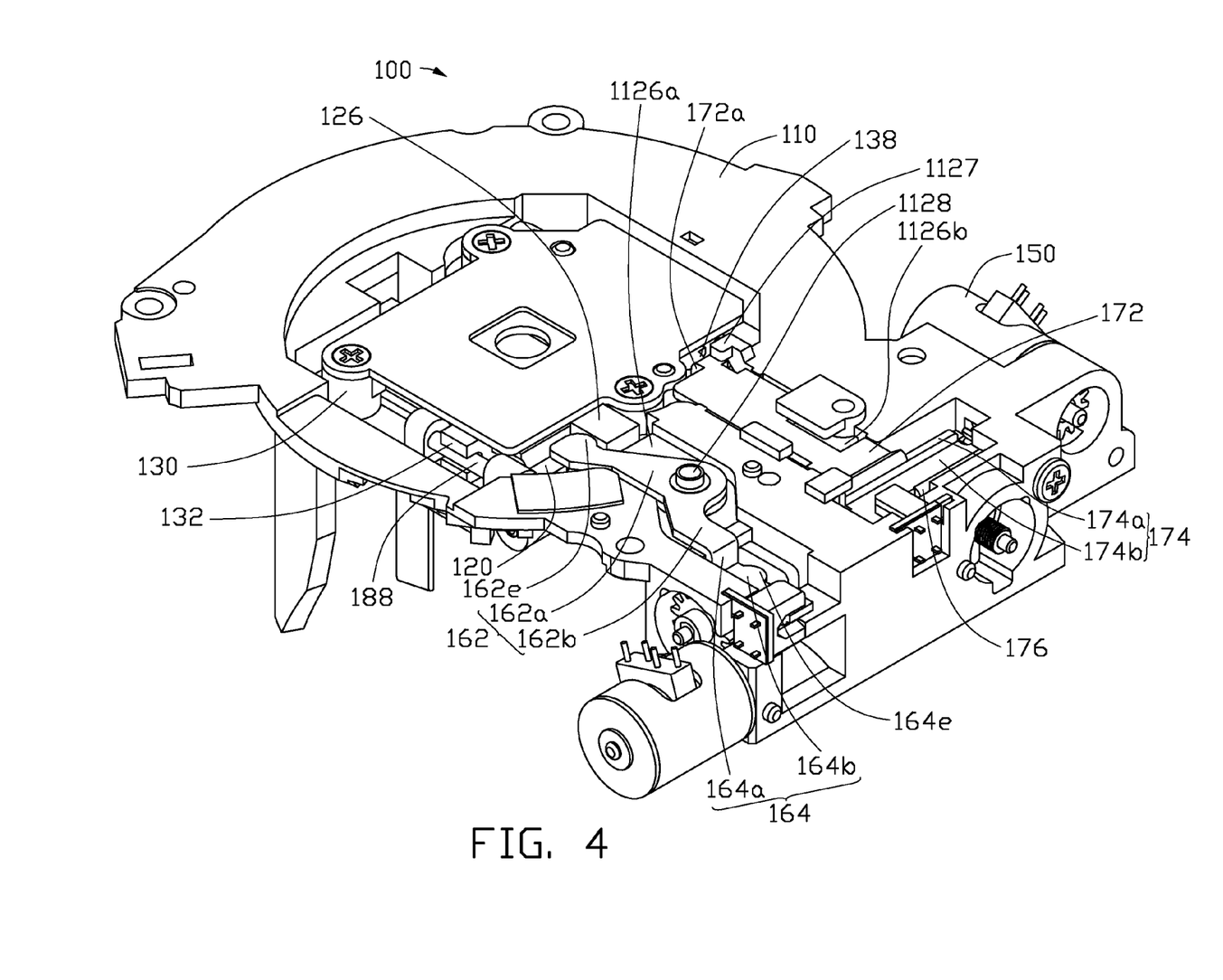
FIG. 4 is an isometric, assembled view of the image sensor holder of FIG. 1 view from another perspective.

In assembling, the first and second motors 142, 152 of the driving devices 140, 150 are mounted on the second support 114 of the frame 110. The first and second transmitting mechanisms 144, 154 and the first and second followers 146, 156 are respectively positioned into the first and second compartments 1143, 1145 of the second support 114 of the frame 110. The first shaft 182 is inserted into the first shaft hole 124a of the first slidable hold 120 and received in the corresponding first through hole 1124d of the frame 110. The second shaft 184 is inserted into the sliding cutout 127a of the first slidable hold 120 and received in the corresponding second through hole 1124e of the frame 110. The first and second shafts 182, 184 are parallel with each other for slidably connecting the first slidable hold 120 and the frame 110. The third shaft 186 is inserted through the second shaft hole 128a of the first slidable hold 120 and received in the corresponding fourth shaft hole 134d of the second slidable hold 130. The fourth shaft 188 is inserted through the third shaft hole 129a of the first slidable hold 120 and received in the corresponding sliding groove 136a of the second slidable hold 130. The third shaft 186 and fourth shaft 188 are parallel with each other for slidably connecting the first slidable hold 120 and second slidable 130. The restoration devices 190 are respectively hitched by the first to fourth hooks 1124c, 125, 125a and 135.

The first driving arm 160 is pivoted on the pivot 1128 of the frame 110 by the pivot hole 162d. The front arm 162a and a portion of the rear arm 162b of the front portion 162 are positioned in the first sliding channel 1126a, and the first convex block 162e formed on the front arm 162a is contacted against the protrusion 126 of the first slidable hold 120. The rear portion 164 of the first driving arm 160 is positioned in the first compartment 1143 and abuts the first follower 146 of the first driving device 140 via the second convex block 164e of the pushing arm 164b.

The second driving arm 170 is slidably positioned in the second sliding channel 1126b by the sliding plate 172. The limiting plate 174 and the pushing plate 176 are positioned in the second compartment 1145. The pushing block 172a is contacted to the second frame walls 132 of the second slidable hold 120, and contacted to the jutting portion 138 formed on the second frame wall 132. The pushing plate 176 of the second driving arm 170 is positioned abutting the second follower 156 of the second motor 150. The U-shaped opening 176a of the pushing plate 176 is configured for avoiding interference with the transmitting mechanism 154 of the second motor 150.

Figure 5:
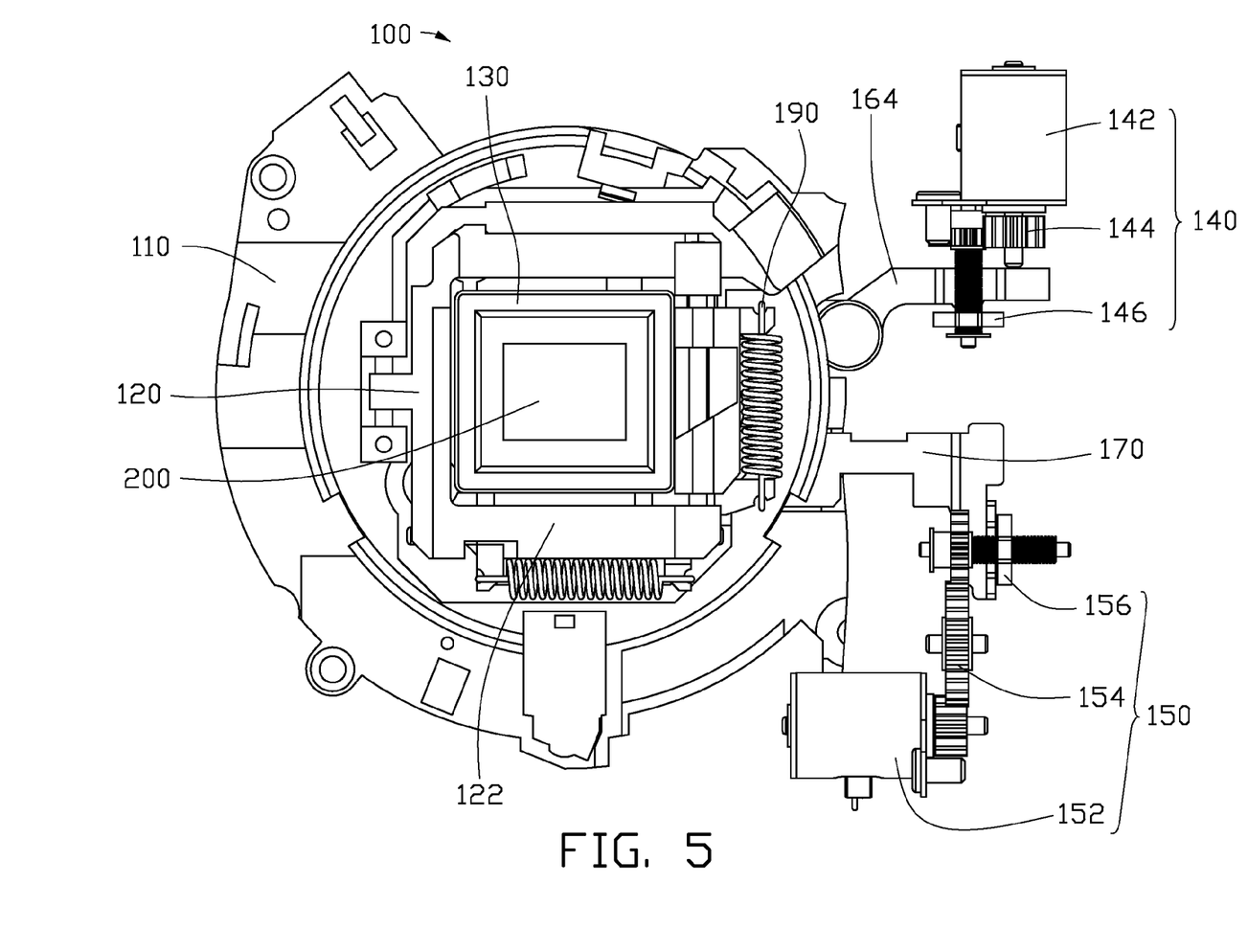
FIG. 5 is a part sectioned view of the assembled image sensor holder of FIG. 3 observed from directly above.
Figure 6:
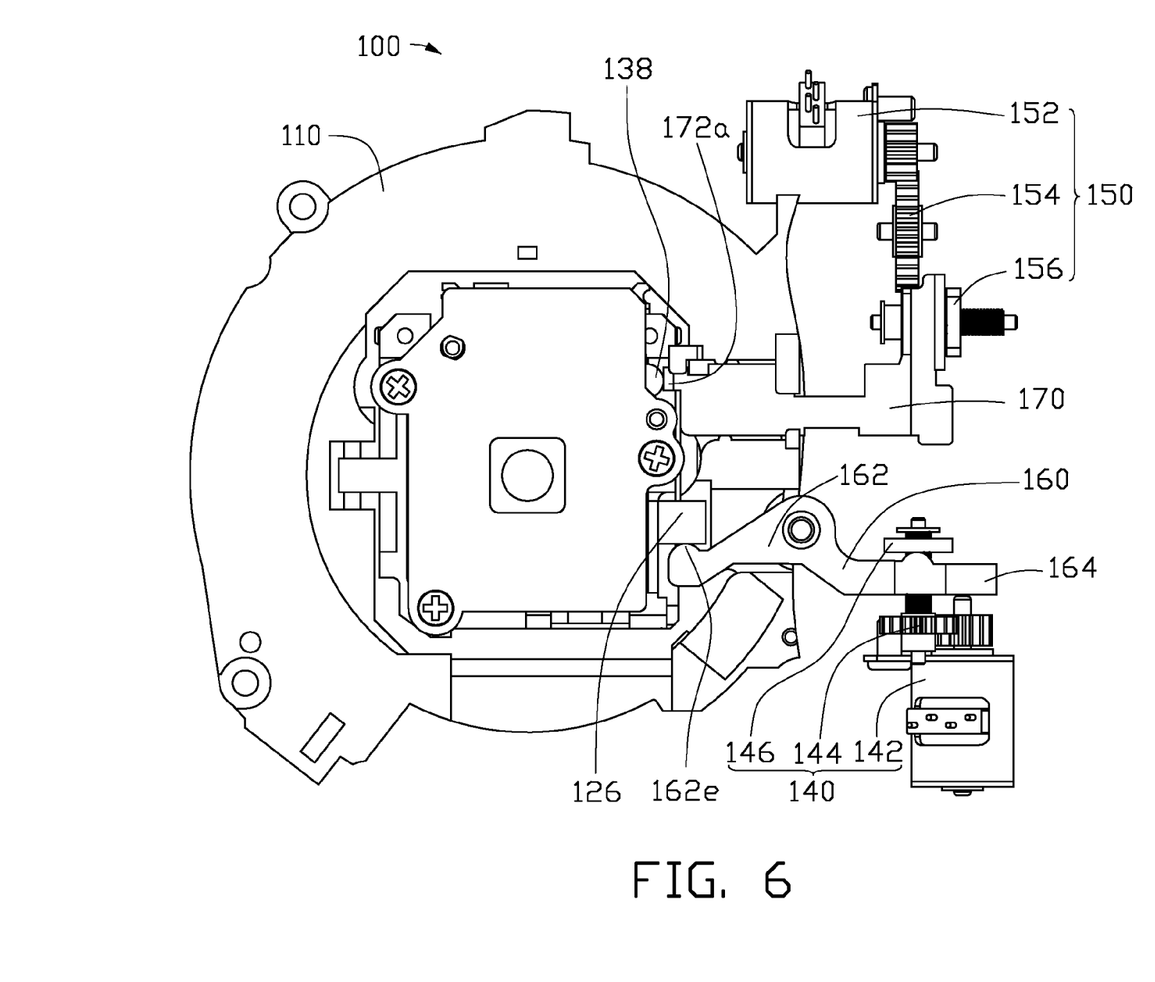
FIG. 6 is a part sectioned view of the assembled image sensor holder of FIG. 4 observed from directly above.

Referring FIGS. 5 and 6, in use, an image sensor chip 200 is attached on the second slidable hold 130. When the first driving device 140 operates, the first follower 146 can be moved linearly by the first transmitting mechanism 144 and the first motor 142. The first moving follower 146 forces the rear portion 164 of the first driving arm 160 to rotate clockwise relative to the pivot 1128 of the frame 110, as well as the rotation of the first driving arm 160. The first convex block 162e pushes against the protrusion 126 of the first slidable hold 120 and drives the first slidable hold 120 sliding along the first and second shafts 182, 184. During the sliding of the first slidable hold 120, the restoration devices 190 hitched on the first and second hooks 1123, 125 are resiliently deformed, when the driving device 160 is powered off the resiliently deformed restoration devices 190 restore the first slidable hold 120 back to the original position.

When the second driving device 150 operates, the second follower 156 can be moved linearly by the second transmitting mechanism 154 and the second motor 152. The moving second follower 156 forces the pushing plate 176 of the second driving arm 170 drives the pushing block 172a to push the second slidable hold 130 to slide along the third and fourth shaft 186, 188, as well as the motion of the second driving arm 170. The restoration device 190 hitched on the third and fourth hooks 125a, 135 is resiliently deformed, and when second driving device 170 is powered off the resiliently deformed restoration device 190 restores the second slidable hold 130 back to the original position.

During forcing the first slidable holder 120 and/or the second slidable holder 130 to move, the first and/or second driving arms 150 causes a torque which can rotate the second slidable holder 130 and the first slidable holder 120 relative to the frame 110. Because the first and second driving arms 150, 160 will directly force the first and second slidable holders 120, 130 in two substantially orthogonal directions, the force-bearing points of the first and second driving arms 150, 160 are adjacent to each other. In other words, there is a short distance between the two force-bearing points of the first and second slidable holders 120, 130. Therefore, the torque caused by the first and the second driving arms 150, 160 can be held to an extremely low level, thus having little ability to cause rotation of the second slidable holder 130. Accordingly, the first and second slidable holders 130 will not rotate relative to the frame 110 during moving, and the precision of the location compensation of the image sensor holder 100 can be improved effectively.

When the first slidable holder 120 is moved by the first driving arm 160, the second slidable holder 130 moves following the first slidable holder 120. The jutting portion 138 of the second slidable holder 130 slides along the surface of the pushing block 172a. As a result, a friction counterforce is applied on the jutting portion 138 by the pushing block 172a.

However the jutting portion 138 has smooth convex surface, and the friction between the jutting portion 138 and the pushing block 172a can be held to a small level and hardly resist the motion of the slidable hold 120.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An image sensor holder comprising:
    a frame;
    a first slidable holder slidably mounted on the frame;
    a second slidable holder slidably mounted on the first slidable holder;
    a first and a second driving devices separately mounted on the frame;
    a first driving arm rotatably mounted on the frame and contacting to the first slidable holder and the first driving device by opposite ends thereof for transmitting driving power of the first driving device to drive the first slidable holder to move relative to the frame;
    a second driving arm slidably mounted on the frame and contacting to the second slidable holder and the second driving device by opposite ends thereof for transmitting driving power of the second driving device to push the second slidable holder to move relative to the first holder; and
    at least two restoration devices separately positioned between the first holder and the frame and between the first holder and the second holder for restoring the first and second holders to original positions.

2. The image sensor holder as claimed in claim 1, wherein the frame comprises a first support comprising an upper surface and an opposite lower surface, and defines a window running through the upper surface and lower surface, a first and a second sliding channels on the lower surface thereof; the first and second sliding channels are communicated to the window; the first slidable holder is received in the windows; the first and second driving arms are correspondingly positioned in the first and second channels.

3. The image sensor holder as claimed in claim 2, wherein the frame further comprises pivot formed on the bottom of the first sliding channel; the first driving arm is pivoted on the pivot.

4. The image sensor holder as claimed in claim 2, wherein the frame further comprises a plurality of guiding bars which are even separately distributed on the bottom of the second sliding channel in a direction parallel to the side walls of the second sliding channel.

5. The image sensor holder as claimed in claim 4, wherein the frame further comprise a plurality of ribs which are separately formed on the two side walls of the second sliding channel and substantially perpendicular to the guiding bars.

6. The image sensor holder as claimed in claim 5, wherein each of the guiding bars and the ribs has a smoothly convex surface.

7. The image sensor holder as claimed in claim 2, wherein the frame further comprises a stop block formed on the lower surface adjacent to the window and extending along the lower surface into the second sliding channel.

8. The image sensor holder as claimed in claim 2, wherein the frame further comprises a first shaft holder substantially perpendicularly protruding from the upper surface adjacent to the window of the substrate and adjacent to the first and second sliding channels; the first slidable holder is slidably mounted on the first shaft holder by two shafts.

9. The image sensor holder as claimed in claim 2, wherein the frame further comprises a second support connected on a side of the first support and adjacent to the first and second sliding channel; the first and second driving device are positioned on the second support.

10. The image sensor holder as claimed in claim 9, wherein the second support comprises a inner plate substantially perpendicularly connected on a side of the substrate of the first support, a outer plate parallel to the inner plate, a top plate connecting the inner and outer plates, and a plurality of spacers substantially perpendicularly connected to the inner, outer and top plates and partitioning the space surrounded by the inner, outer and top plates into a first compartment and second compartment isolated from the first compartment; the first driving device is received in the first compartment; the second driving device is received in the second compartment.

11. The image sensor holder as claimed in claim 10, wherein the top plate defines a first hole and a second first hole therein corresponding the first and second sliding channels; the inner plate defines a first cutout communicating the first sliding channel and first holes, and second cutout communicating the second sliding channel and second holes; the first driving arm passes through the first cutout and first hole connected to the first driving device; the second driving arm passes through the second cutout and second hole connected to the second driving device.

12. The image sensor holder as claimed in claim 11, wherein the second support comprises a plurality of guiding ribs formed on the bottom of the second cutout.

13. The image sensor holder as claimed in claim 11, wherein the first driving arm comprises a driving portion contacting against the first slidable holder and a follower portion connected to the first driving device.

14. The image sensor holder as claimed in claim 13, wherein the driving portion comprises a front arm contacting against the first slidable holder and rear arm which are connected at an angle together and form a corner portion.

15. The image sensor holder as claimed in claim 14, wherein the driving portion further comprises a first convex block extending from the front arm and contacting against the first slidable holder.

16. The image sensor holder as claimed in claim 15, wherein the frame further comprises pivot formed on the bottom of the first sliding channel; the corner portion of the driving portion defines a pivot hole therein pivoting on the pivot of the frame thereby.

17. The image sensor holder as claimed in claim 15, wherein the first slidable holder is a square framework and comprises a number of first frame walls perpendicularly connected in turns, and a protrusion projected outward from an outer surface of one frame wall and contacting the pushing block of the second driving arm.

18. The image sensor holder as claimed in claim 11, wherein the second driving arm comprises a sliding plate, a limiting plate connected to the sliding plate, and a pushing plate connected to the limiting plate; the sliding plate is positioned in the second sliding channel and contacts against the second slidable holder; the limiting plate and the pushing plate are positioned in the second holes of the second support; the pushing plate is connected to the second driving device.

19. The image sensor holder as claimed in claim 18, wherein the limiting plate comprises a pushing block perpendicularly formed on an end thereof, the pushing block contacts the second sable holder.

20. The image sensor holder as claimed in claim 19, wherein the second slidable holder is a square framework and comprises a number of second frame walls perpendicularly connected in turns and a jutting portion formed on a second frame and contacting the first convex block of the first driving arm.

* * * * *